US010741214B2

(12) United States Patent
Onozawa

(10) Patent No.: US 10,741,214 B2
(45) Date of Patent: Aug. 11, 2020

(54) IMAGE PROCESSING APPARATUS THAT SELECTS IMAGES, IMAGE PROCESSING METHOD, AND STORAGE MEDIUM

(71) Applicant: CASIO COMPUTER CO., LTD., Tokyo (JP)

(72) Inventor: Masaru Onozawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/348,393

(22) Filed: Nov. 10, 2016

(65) Prior Publication Data

US 2017/0140789 A1    May 18, 2017

(30) Foreign Application Priority Data

Nov. 18, 2015  (JP) .................................. 2015-226135

(51) Int. Cl.
G11B 27/031  (2006.01)
G06K 9/00  (2006.01)
G11B 27/10  (2006.01)

(52) U.S. Cl.
CPC ........ G11B 27/031 (2013.01); G06K 9/00744 (2013.01); G06K 9/00751 (2013.01); G11B 27/10 (2013.01)

(58) Field of Classification Search
CPC ............................ G11B 27/10; G06K 9/00758
See application file for complete search history.

(56) References Cited

U.S. PATENT DOCUMENTS 5,642,430 A     6/1997  Greer et al.
7,301,092 B1   11/2007  McNally et al.
2010/0020224 A1  1/2010  Hattori et al.
2010/0092091 A1* 4/2010  Kanda .................... A61B 1/041
                                                          382/190

(Continued)

FOREIGN PATENT DOCUMENTS

EP      2116970 A1   11/2009
JP    2005-33554 A    2/2005

(Continued)

OTHER PUBLICATIONS

Japanese Office Action dated May 23, 2017, issue in corresponding Japanese patent application 2015-226135 and English translation. (9 pages).

(Continued)

*Primary Examiner* — Girumsew Wendmagegn
(74) *Attorney, Agent, or Firm* — Fitch, Even, Tabin & Flannery LLP

(57) ABSTRACT

An image capture apparatus includes an image acquisition unit, a feature-amount-calculation unit, a score compensation unit, and an image selection unit. The image acquisition unit acquires a plurality of images. The image acquisition unit acquires information relating to image capture timing of the plurality of images. The feature-amount-calculation unit and the score compensation unit evaluate the plurality of images based on the information relating to the image capture timing. The image selection unit selects a predetermined number of images from the plurality of images based on an evaluation result by the feature-amount-calculation unit and the score compensation unit.

18 Claims, 9 Drawing Sheets

(56) References Cited

U.S. PATENT DOCUMENTS

| | | | | |
|---|---|---|---|---|
| 2010/0094441 A1* | 4/2010 | Mochizuki | ........ | G06F 17/30256 700/94 |
| 2011/0081088 A1 | 4/2011 | Xiao | | |
| 2012/0099842 A1* | 4/2012 | Yasuda | ................ | G11B 27/034 386/278 |
| 2016/0286072 A1 | 9/2016 | Hino et al. | | |

FOREIGN PATENT DOCUMENTS

| | | |
|---|---|---|
| JP | 2006-340108 A | 12/2006 |
| JP | 2007-188561 A | 7/2007 |
| JP | 3952684 B2 | 8/2007 |
| JP | 2007-267351 A | 10/2007 |
| JP | 2008-312060 A | 12/2008 |
| JP | 2010-177731 A | 8/2010 |
| JP | 2011-9976 A | 1/2011 |
| JP | 2011-029916 A | 2/2011 |
| JP | 2011-82915 A | 4/2011 |
| JP | 4811433 B2 | 11/2011 |
| JP | 5072757 B2 | 11/2012 |
| JP | 2013-232813 A | 11/2013 |
| JP | 2015-114920 A | 6/2015 |
| JP | 2015-126517 A | 7/2015 |

OTHER PUBLICATIONS

USPTO; U.S. Appl. No. 15/347,517; Office Action dated May 29, 2019.

USPTO; U.S. Appl. No. 15/347,517; Office Action dated Nov. 14, 2018.

JPO; Application No. 2015-226133; Notification of Reasons for Refusal dated Jul. 3, 2018.

JPO; Application No. 2015-226133; Notification of Reasons for Refusal dated Apr. 17, 2018.

USPTO; U.S. Appl. No. 15/347,517; Office Action dated May 16, 2018.

USPTO; U.S. Appl. No. 15/347,517; Office Action dated Oct. 19, 2017.

EPO; Application No. 16198117.0; European Search Report dated Apr. 19, 2017.

* cited by examiner

FIG. 2A
| Image [p] | A | B | C | D |
|---|---|---|---|---|
| Time [τ] | 2 | 3 | 1 | 2 |
| Score [s] | 8 | 5 | 10 | 6 |
| ExTime | 2 | 4 | 5 | 6 |
FIG. 2B
| Time [t] | 0 | 1 | 2 | 3 | 4 | 5 | 6 |
|---|---|---|---|---|---|---|---|
| A |   |   | 8 |   |   |   |   |
| B |   |   | 8 | 5 |   | 13 |   |
| C |   | 10 | 8 | 18 | 15 | 13 | 23 |
| D |   |   | 10 | 8 | 18 | 15 | 24 | 23 |
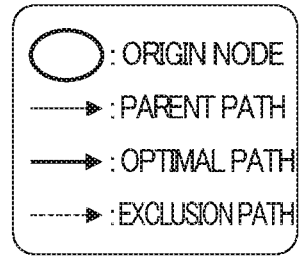
○ : ORIGIN NODE
→ : PARENT PATH
➔ : OPTIMAL PATH
--➔ : EXCLUSION PATH
FIG. 2C
| Time [t] | 0 | 1 | 2 | 3 | 4 | 5 | 6 |
|---|---|---|---|---|---|---|---|
| A |   |   | 8 |   |   |   |   |
| B |   |   | 8 | 4 |   | 12 |   |
| C |   | 2 | 8 | 14 | 12 | 12 | 20 |
| D |   | 2 | 8 | 14 | 12 | 18.8 | 20 |
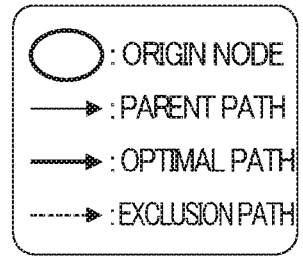
○ : ORIGIN NODE
→ : PARENT PATH
➔ : OPTIMAL PATH
--➔ : EXCLUSION PATH

IMAGE PROCESSING APPARATUS THAT SELECTS IMAGES, IMAGE PROCESSING METHOD, AND STORAGE MEDIUM

CROSS-REFERENCE TO RELATED APPLICATION

This application is based on and claims the benefit of priority from Japanese Patent Application No. 2015-226135, filed on 18 Nov. 2015, the content of which is incorporated herein by reference.

BACKGROUND OF THE INVENTION

Field of the Invention

The present invention relates to an image processing apparatus that selects images, an image processing method, and a storage medium.

Related Art

Conventionally, as disclosed in Japanese Unexamined Patent Application, Publication No. 2007-267351, a technology has been known which generates a moving image such as a slide show by compositing a plurality of kinds of images.

For example, Japanese Unexamined Patent Application, Publication No. 2007-267351 discloses the technology that extracts a moving image with a time point at which power (sound volume) of a sound signal is great as a peak time point.

SUMMARY OF THE INVENTION

According to an aspect of the present invention, an image processing apparatus comprising a processor which is configured to execute:

image acquisition processing that acquires a plurality of images;

timing acquisition processing that acquires information relating to image capture timing of the plurality of images;

first evaluation processing that evaluates the plurality of images based on the information relating to the image capture timing; and selection processing that selects a predetermined number of images among the plurality of images based on an evaluation result by the first evaluation processing.

According to an aspect of the present invention, an image processing method executed by an image processing apparatus, the method comprising the steps of:

acquiring a plurality of images;

acquiring information relating to image capture timing of the plurality of images;

evaluating the plurality of images based on the information relating to the image capture timing; and selecting a predetermined number of images among the plurality of images based on an evaluation result in the step of evaluating.

According to an aspect of the present invention, a non-transitory storage medium encoded with a computer-readable program that enables a computer to execute:

an image acquisition function that acquires a plurality of images;

a timing acquisition function that acquires information relating to image capture timing of the plurality of images;

a first evaluation function that evaluates the plurality of images based on the information relating to the image capture timing; and a selection function that selects a predetermined number of images among the plurality of images based on an evaluation result by the first evaluation function.

BRIEF DESCRIPTION OF THE DRAWINGS

FIG. 2A is a schematic diagram illustrating a specific example of an optimization classified by score;

FIG. 2B is a schematic diagram illustrating a specific example of an optimization classified by score;

FIG. 2C is a schematic diagram illustrating a specific example of an optimization classified by score;

DETAILED DESCRIPTION OF THE INVENTION

Embodiments of the present invention are explained below with reference to the drawings.

First Embodiment

Figure 1:
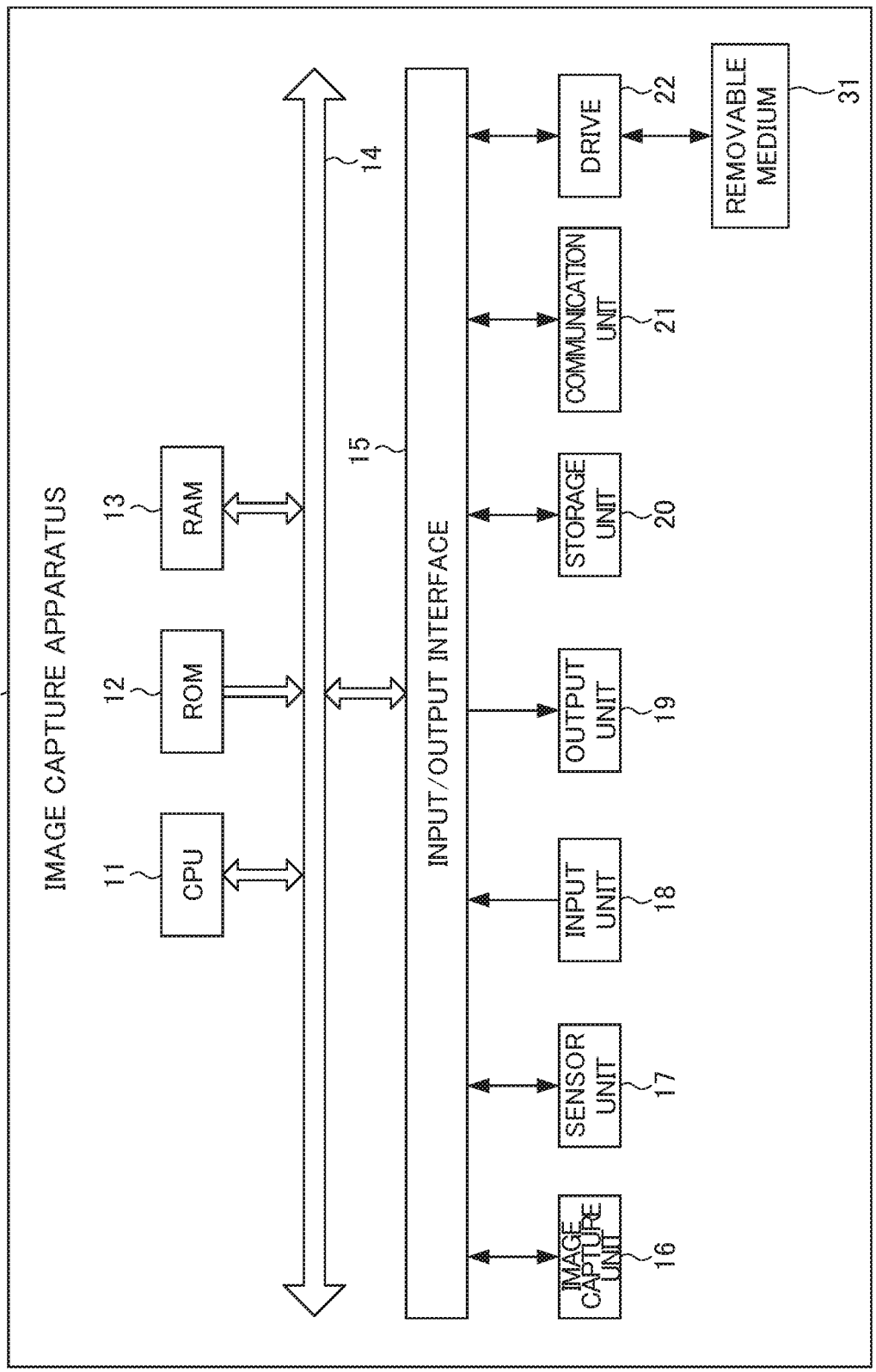
FIG. 1 is a block diagram illustrating a hardware configuration of an image capture apparatus according to an embodiment of the present invention.

FIG. 1 is a block diagram illustrating a hardware configuration of an image capture apparatus 1 according to a first embodiment of the present invention.

The image capture apparatus 1 is configured as, for example, a digital camera.

The image capture apparatus 1 includes a CPU (Central Processing Unit) 11, ROM (Read Only Memory) 12, RAM (Random Access Memory) 13, a bus 14, an input/output interface 15, an image capture unit 16, a sensor unit 17, an input unit 18, an output unit 19, a storage unit 20, a communication unit 21, and a drive 22.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the sensor unit 17, the input unit 18, the output unit 19, the storage unit 20, the communication unit 21, and the drive 22 are connected to the input/output interface 15.

The image capture unit 16 includes an optical lens unit and an image sensor, which are not illustrated.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, an image processing unit (not illustrated), and the like as appropriate.

The sensor unit 17 is configured by various kinds of sensors such as an acceleration sensor which obtains information relating to acceleration and a gyro sensor which obtains information relating to an angular speed.

In the present embodiment, when photographing is performed at the image capture unit 16, sensor information upon photographing is obtained and the information is stored by being associated with images photographed.

The input unit 18 is configured by various buttons and the like, and inputs a variety of information in accordance with instruction operations by the user.

The output unit 19 is configured by the display unit, a speaker, and the like, and outputs images and sound.

The storage unit 20 is configured by DRAM (Dynamic Random Access Memory) or the like, and stores data of various images.

The communication unit 21 controls communication with other devices (not shown) via networks including the Internet.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 20, as necessary. Similarly to the storage unit 20, the removable medium 31 can also store a variety of data such as the image data stored in the storage unit 20.

When trying to browse a plurality of images stored, since it take a great amount of time to browse all of the images, the image capture apparatus 1 as configured above has a function of selecting only characteristic images which are fewer than the total number of the plurality of images stored and providing them for a user to browse.

In the image capture apparatus 1 according to the present embodiment, the images selected are made into a moving image as frame images in order to generate a summarized moving image in which only characteristic scenes are collected (hereinafter, referred to as "highlight moving image") and provided to the user to browse.

Basic Flow of Selection Method of Image Combination (Optimization Classified by Score)

In the present embodiment, the image capture apparatus 1 calculates a feature amount of an image which is targeted for generating a highlight moving image (hereinafter, also referred to as "candidate image"), based on attribute information such as sensor information when photographing an image (acceleration information and angular speed information), an image analysis result (presence or absence of a specific subject such as a face, etc.), and information relating to a usage condition (the number of playbacks, information relating to uploading to SNS, etc.).

Then, the image capture apparatus 1 sets a score as a value of an image (hereinafter, referred to as "image score") based on the feature amount thus calculated.

It should be noted that the image score may be set uniquely according to an item used for calculating the feature amount based on a person's subjectivity.

It should also be noted that the image score may be set comprehensively according to weighting by weighting each of the items of the feature amounts based on machine learning with subjective evaluation results as training data.

In addition, the image capture apparatus 1 performs ranking based on the image score.

The rank is used for determining individual playback times of the images in the highlight moving image to be generated.

It should be noted that the rank may be given arbitrarily by a user or may be given according to an image score that is set to an image.

In addition, the image capture apparatus 1 searches for a path in which a score generated by adding up image scores of each of the images (hereinafter, referred to as "added score") becomes the maximum combination in the order of capturing the images among image combinations having the total individual playback time (total playback time) within the maximum playback time, with the maximum playback time of the highlight moving image as the upper limit.

Here, in the present embodiment, selecting the path of the maximum added score under the regulation of the maximum playback time of a moving image is referred to as "optimization classified by score".

FIGS. 2A and 2B are schematic views illustrating a specific example of an optimization classified by score. In the present example, the maximum playback time of a highlight moving image is set to 6 seconds.

It should be noted in FIG. 2B that, as a path from an origin node, a path which does not become an appropriate path from the view point of the combination of individual playback times, the image scores, etc., is shown as "exclusion path", a path that can be set is shown as "parent path", and a path in which the added score becomes the highest is shown as "optimal path".

For example, in the present embodiment, a path in which images are combined in the order of photography is set on the matrix of the individual playback time and the images in the order of photography.

The image capture apparatus 1 selects, as an image group that constitutes a highlight moving image, a path combination in which the added score that is made by adding image scores of images in a path becomes the maximum score among each of the path combinations.

The "path in which the images are combined in the order of photography" refers to a path which is calculated by performing a path search sequentially from the first image toward the final image in the order of photographing the images in the present embodiment.

In the example of FIG. 2A, an image A to an image D in the order of photography are set as candidate images for frame images which constitute a highlight moving image.

In the image A to the image D, image scores calculated based on feature amounts of images are set: the image A [Score: 8]; the image B [Score: 5]; the image C [Score: 10]; and the image D [Score: 6]. Individual playback times of images are also set: the image A [Time: 2 seconds]; the image B [Time: 3 seconds]; the image C [Time: 1 second]; and the image D [Time: 2 seconds].

In addition, the individual playback time may be configured so as to correspond to an image score, etc.

For example, it may be configured so that an image having a high image score has a longer individual playback time and an image having a low image score has a shorter individual playback time.

It should be noted that ExTime (expectation highlight time) in FIG. 2A will be described later.

In FIG. 2B, in the image group in which the image scores and the individual playback time are set, the image capture apparatus 1 sets a path in which the images are combined in the order of photography within the maximum playback time of a moving image that is set in the matrix of the vertical axis representing the order of photographing images and the horizontal axis representing playback times of moving images.

The image capture apparatus 1 calculates added scores of all of the images that constitute a path in the path that is set, and selects a path combination having the maximum added score.

In the present example, a path in which the added score becomes [24] among each of the paths becomes a path in which the added score becomes the maximum score.

This path is composed of the combination of the image C and the image D with the image A as an origin node.

In other words, the path from the image A to the image C and to the image D becomes an optimal path.

It should be noted that, although the optimization classified by score which takes into account the added score only is performed in the present example, it may be configured so that the optimization classified by score which takes into account the matter of making a total playback time longer is performed.

In such a case, the total playback time becomes 6 seconds, which is the maximum score, and the image capture apparatus 1 selects the combination of the image B and the image C with the image A as an origin node for which the added score is [23], which is comparatively high.

Thereafter, the image capture apparatus 1 creates a highlight moving image consisting of a total playback time made by adding the individual playback times of each of the images in the playback order in the path selected.

Time Diffusion Improvement

In the case of performing the optimization classified by score as described above, images photographed at close times may be included unevenly in a combination of images selected.

On the other hand, a situation may occur in that, when trying to uniformize the images selected on a temporal axis by paying attention to photographing timing (hereinafter, referred to as photography time), in a case of there being unevenness in photography times, images in an image group photographed at close times are not likely to be selected regardless of the contents of the images.

Figure 3:
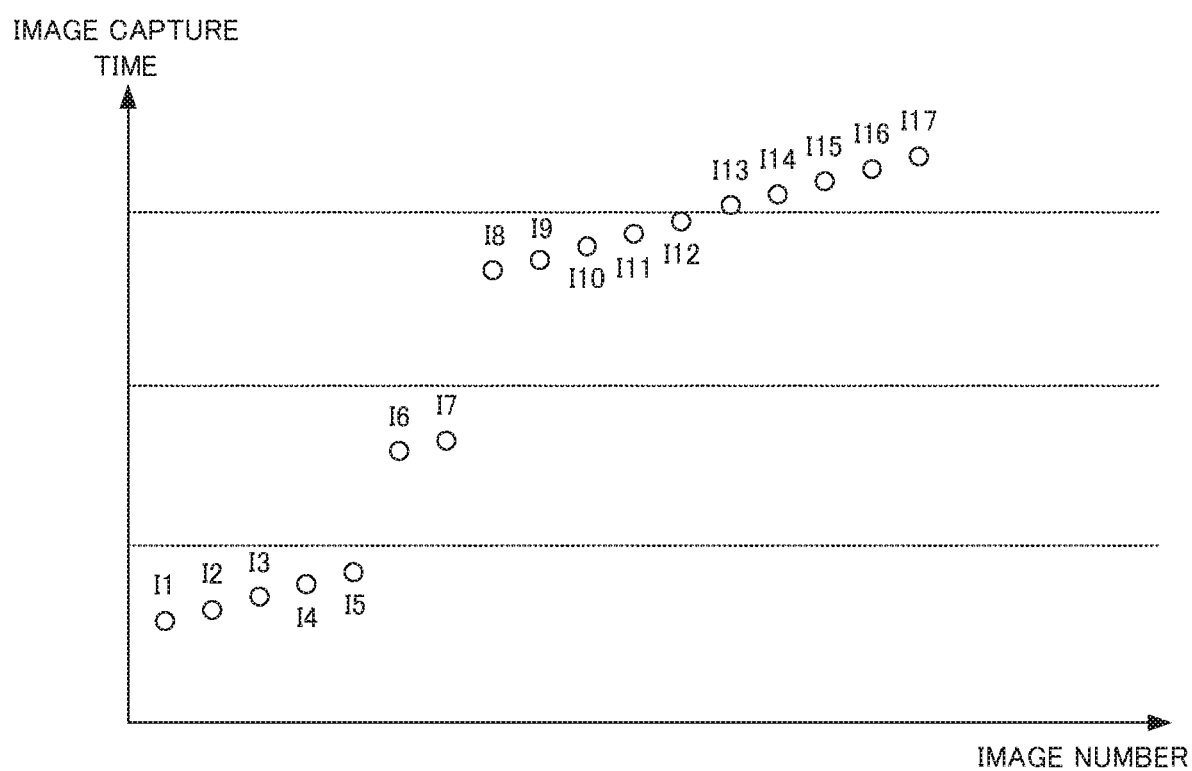
FIG. 3 is a schematic view illustrating a distribution example of photography time.

FIG. 3 is a schematic view illustrating a distribution example of photography time.

In FIG. 3, although images I1 to I5 are photographed at a constant interval, subsequent images I6 and I7 are not photographed immediately, and, after a predetermined elapse of time, images I8 to I17 are photographed.

In such a case of the distribution of photography times being uneven, when trying to uniformize the images selected by paying attention to only photography time, a situation occurs in that only one image among a plurality of images is selected in an image group photographed at close times, and thus, it is not possible to select appropriate images.

For example, in a case in which, by dividing a day into three groups of time, and photographing 10 times in the morning, photographing 2 times in the daytime, and photographing 5 times at night, a single image is selected from each of the groups, a situation occurs in that the images photographed in the daytime are likely to be selected, when compared to the image group photographed in the morning, regardless of the image contents.

In view of this, the present method calculates a penalty amount in order to improve time diffusion of each of the images based on the indices of the photography time and the order of photographing and compensates an image score acquired by the abovementioned selection method (optimization classified by score) with the penalty amount.

With such a configuration, since an added score of a path including desired images from the view point of the time diffusion as a result becomes high, a combination path of appropriate images from the viewpoint of time diffusion is easily selected.

In the present example, evaluation of an image upon judging time diffusion is calculated using photography times and an order of photographing of each of the images

[Formula (1)]

$$\text{Value}p = (\alpha < p) + (1-\alpha)\text{CaptTime}p \quad (1)$$

It should be noted that "$\alpha$" represents a mixing ratio, "p" represents an image number, "CaptTimep" represents photography time of Image p, and "Valuep" represents a value showing an evaluation of Image p.

However, so long as it is possible to calculate an evaluation from photography times and an order of photographing of images, a function other than Formula (1) may be used.

In addition, a placement time at which Image p is considered to be desired to be placed in a highlight moving image is calculated [Formula (2)]

$$\text{ExTime}p = (\text{Value}p/\text{Valuemax})HL\text{Time} \quad (2)$$

It should be noted that "ExTimep" refers to a desired placement time of Image p within the highlight moving image (expectation highlight time), "Valuemax" refers to a value showing an evaluation of a final image, and "HLTime" refers to a total playback time of the highlight moving image.

In addition, the degree to which the expectation highlight time of Image p calculated by Formula (2) deviates from the attention time in the optimization classified by score (time error rate) is calculated (Formula (3))

$$\text{DiffRate}p = \text{abs}(\text{FldTime} - \text{Extime}p/HL\text{time}) \quad (3)$$

It should be noted that "DiffRatep" refers to a value showing a time error rate within the highlight moving image of Image p, and "FldTime" refers to an attention time in the highlight moving image.

In addition, "abs" refers to an operator which assumes an absolute value.

Herein, the attention time refers to a time as a guide for timing for switching images in the highlight moving image.

For example, a total playback time of the highlight moving image (or the maximum playback time) is divided by the average of individual playback times distributed to candidate images of the highlight moving image.

According to this processing, an average period during which a single image is displayed is calculated, and the total playback time (or the maximum playback time) of the highlight moving image is divided into a section for each of the average periods.

Then, the boundary of this section becomes an attention time to switch images.

Then, by subtracting the time error rate thus calculated from 1, penalty of Image p with respect to the attention time is calculated [Formula (4)]

$$Kp = 1 - \text{DiffRate}p \quad (4)$$

Figure 4:
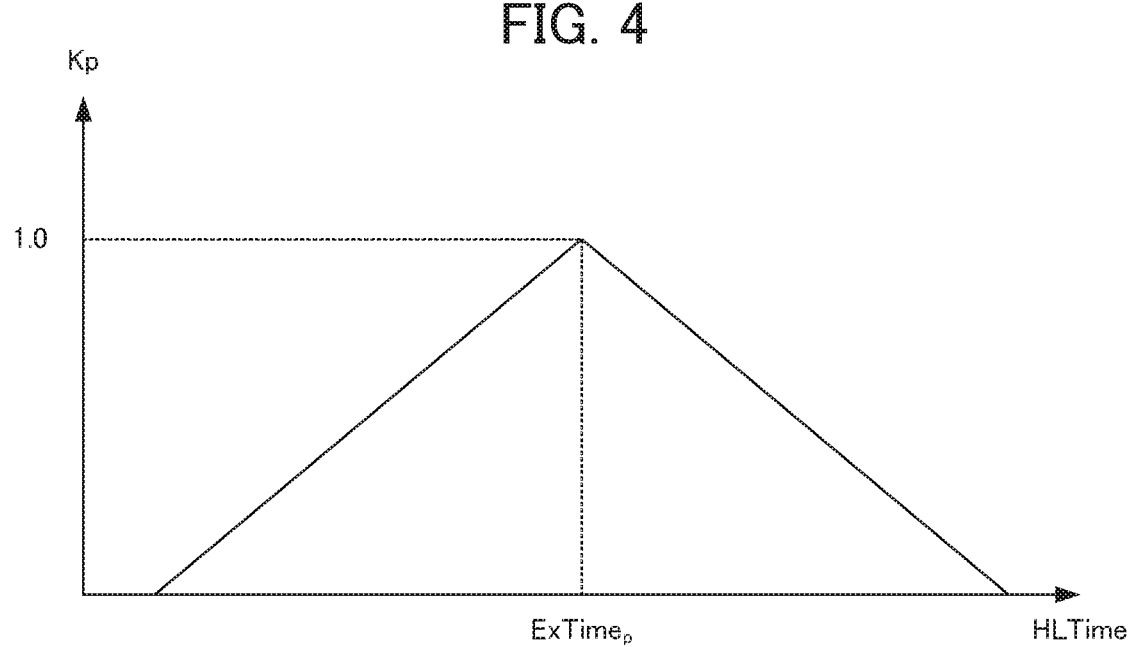
FIG. 4 is a schematic view illustrating a characteristic of Penalty Kp represented by Formula (4)

FIG. 4 is a schematic view illustrating a characteristic of Penalty Kp ($1 \geq Kp \geq 0$) represented by Formula (4).

As illustrated in FIG. 4, Penalty Kp relating to time diffusion of Image p approaches 0 as it moves away from the expectation highlight time.

In other words, as Image p is placed at a position closer to the expectation highlight time (attention time), the value of Penalty Kp approaches 1 and, in the case of compensating an image score calculated by the optimization classified by score (for example, multiplication) with Penalty Kp, a high score is maintained.

For example, in FIG. 2B, as the playback time t at which Image p is placed is closer to the expectation highlight time, an image score in a matrix is compensated so as to maintain a high score.

In addition, as the playback time t moves away from the expectation highlight time, the image score within the matrix is compensated so as to become low.

For this reason, when giving penalty to an image score according to time diffusion of an image in each of the combination paths of images in the optimization classified by score, a score of the image in which the expectation highlight time is close to the attention time is compensated to be relatively high.

When calculating an added score of each of the paths including the score of the image compensated in this way and selecting a path of a combination having the highest added score, a path including appropriate images from the view point of time diffusion is selected.

It should be noted that, although it is described that Penalty Kp has the upper limit of "1" and is a compensated value that decreases the image score in the present example, it may be configured so that a value greater than 1 is allowed as Penalty Kp and is set as a compensated value which increases the image score.

FIG. 2C illustrates an example of a combination optimization when improving time diffusion.

Similarly to FIG. 2B, in FIG. 2C, the image A to the image D in the order of photography are set as candidate images for frame images which constitute a highlight image.

In the image A to the image D, image scores calculated based on feature amounts of images are set: the image A [Score: 8]; the image B [Score: 5]; the image C [Score: 10]; and the image D [Score: 6].

Individual playback times of images are distributed based on the image scores: the image A [Time: 2 seconds]; the image B [Time: 3 seconds]; the image C [Time: 1 second]; and the image D [Time: 2 seconds].

In addition, the expectation highlight time (ExTime) is set with respect to each of the images as follows.

Image A[ExTime: 2], Image B[ExTime: 4], Image C[Extime: 5], and Image D[ExTime: 6].

In FIG. 2C as well, in the image group in which the image score and the individual playback time are set in this way, a combination path search is performed which is similar to that in FIG. 2B.

Upon the optimization path search, in order to improve time diffusion as described above, penalty is assigned to a score of the image based on the expectation highlight time and the attention time which are set for each of the images.

For the purpose of simplifying the descriptions, in FIG. 2C, it is set so that the score is subtracted by 20% for each time it moves away by 1 second from the expectation highlight time.

In the paths which are set as described above, the added scores of all of the images constituting the paths are calculated so as to select a path combination having the maximum added score.

The present example is different from that in FIG. 2B which does not consider time diffusion, and a path having the added score of [20] becomes a path having the maximum added score.

This path is composed of the combination of the image B and the image C with the image A as an origin node.

In other words, the path from the image A to the image B and to the image C becomes the optimal path.

Figure 5:
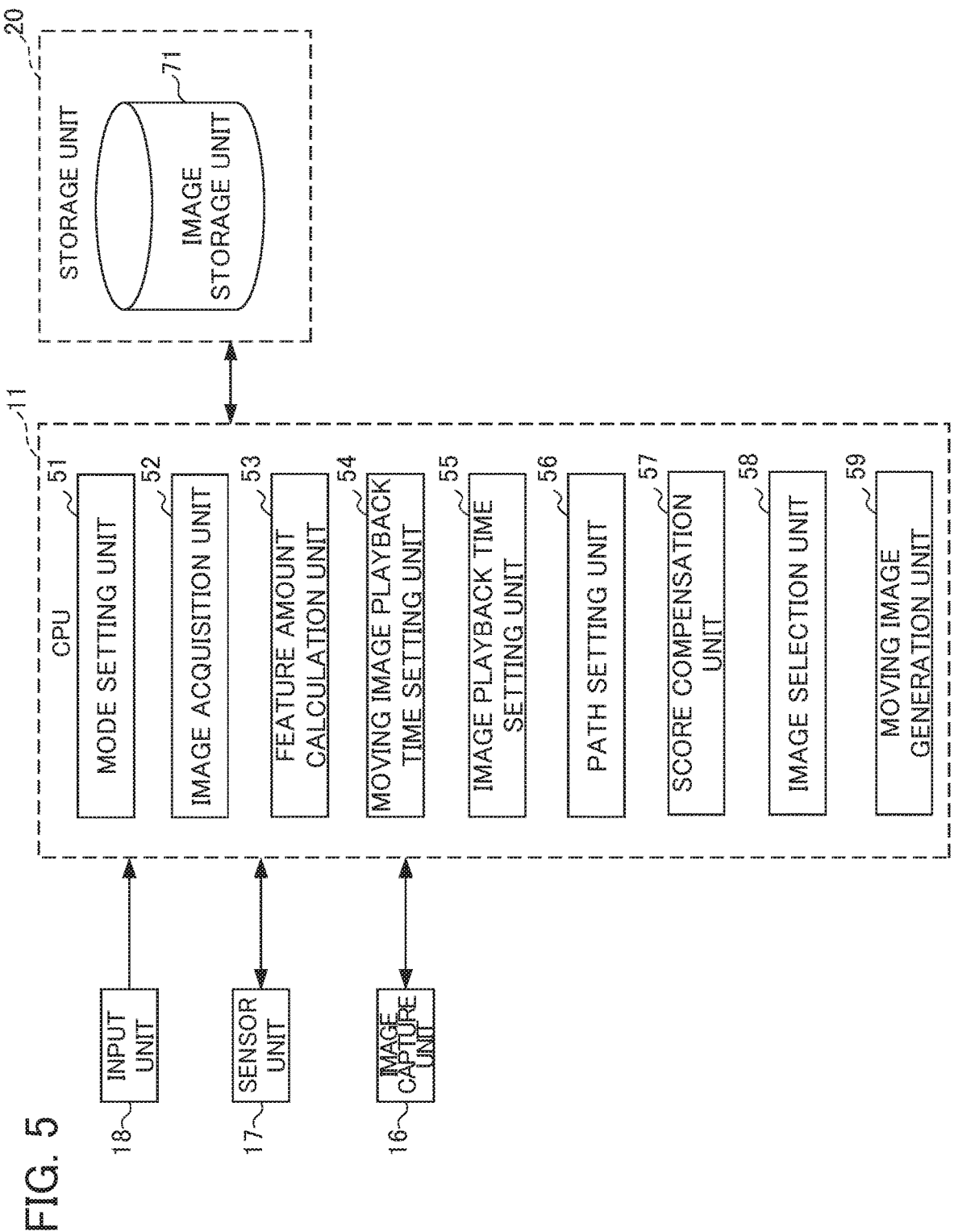
FIG. 5 is a functional block diagram illustrating a functional configuration for executing highlight-moving-image-generation processing among the functional configurations of the image capture apparatus of FIG. 1.

FIG. 5 is a functional block diagram illustrating a functional configuration for executing highlight-moving-image-generation processing among the functional configurations of the image capture apparatus 1 of FIG. 1.

Highlight-moving-image-generation processing refers to a sequence of processing of generating a highlight moving image including candidate images as a combination having high image scores selected from among a plurality of candidate images.

As illustrated in FIG. 5, in the case of executing the highlight-moving-image-generation processing, a mode setting unit 51, an image acquisition unit 52, a feature-amount-calculation unit 53, a moving-image-playback-time-setting unit 54, an image-playback-time-setting unit 55, a path setting unit 56, a score compensation unit 57, an image selection unit 58, and a moving image generation 59 function in the CPU 11.

In addition, a moving image storage unit 71 is set in an area of the storage unit 20.

In the moving image storage unit 71, image data is stored which is associated with sensor information acquired when photography.

The mode setting unit 51 sets a mode via the input unit 18 by a user, for example.

In the present embodiment, the modes of "normal mode" and "time diffusion improvement mode" can be set.

The "normal mode" is a mode which selects a path of a combination for which the totaled score is the highest score, with a time in which a total playback time of a moving image that is set is within the maximum playback time, and then selects images that constitute the selected path as frame images.

In the "normal mode", a path selection of a combination of images is performed by using the abovementioned method of "Optimization classified by score".

The "time diffusion improvement mode" is a mode which selects so that the photography times are more appropriately diffused. In the "time diffusion improvement mode", a path selection of a combination of images is performed by using the abovementioned method of "time diffusion improvement" so as to compensate scores of candidate images calculated by the "normal mode".

The image acquisition unit 52 acquires a plurality of candidate images as targets for highlight moving images from the moving image storage unit 71. Photography information including photography time and serial numbers of captured images (in the order of photographing) are added to the images acquired by the image acquisition unit 52.

The feature-amount-calculation unit 53 calculates a feature amount for each of the candidate images thus acquired according to the abovementioned method of "optimization classified by score". In the present embodiment, the feature amount is calculated based on feature points, etc., within images analyzed through image analyses on the candidate images.

In addition, the feature-amount-calculation unit 53 calculates the scores of the candidate images based on the feature amounts, and performs ranking of the candidate images according to the scores.

In other words, the scores and the ranking are assigned to the candidate images.

The moving-image-playback-time-setting unit 54 sets the maximum playback time (for example, 6 seconds) of a highlight moving image via the input unit 18 by a user.

The image-playback-time-setting unit 55 sets individual playback times of the candidate images within the moving image according to the ranks of the candidate images, which are determined based on the scores. It should be noted that the individual playback times of the candidate images may be configured so as to be set by a user regardless of the scores or the ranks.

The path setting unit 56 sets a path combination (arrangement) that can be selected in a matrix constituted by the individual playback time of the highlight moving image and the candidate images based on the order of photographing the images and the individual playback times of the candidate images that are set.

In other words, the path setting unit 56 sets a combination (arrangement) of candidate images within the maximum playback time of the highlight moving image with the order of photographing the images as a restriction of the arrangement.

The score compensation unit 57 compensates the image scores according to the mode that is set. However, in the case of the "normal mode", the score compensation unit 57 does not compensate the image scores.

It should be noted that, in the case of the "time diffusion improvement mode", the score compensation unit 57 calculates Penalty Kp which represents time diffusion of each of the images corresponding to the attention time, based on the indices of the photography time and the order of photographing according to the abovementioned method of "time diffusion improvement", and compensates the image scores acquired by the optimization classified by score with Penalty Kp.

The image selection unit 58 selects a path having the highest added score and selects the candidate images to constitute a path.

It should be noted that, in the case of the "time diffusion improvement mode", the path is selected based on the added score after the image score being compensated with Penalty Kp.

The moving image generation unit 59 generates a highlight moving image which is configured so that the candidate images of the path selected by the image selection unit 58 become the total playback time within the maximum playback time that is set.

Figure 6:
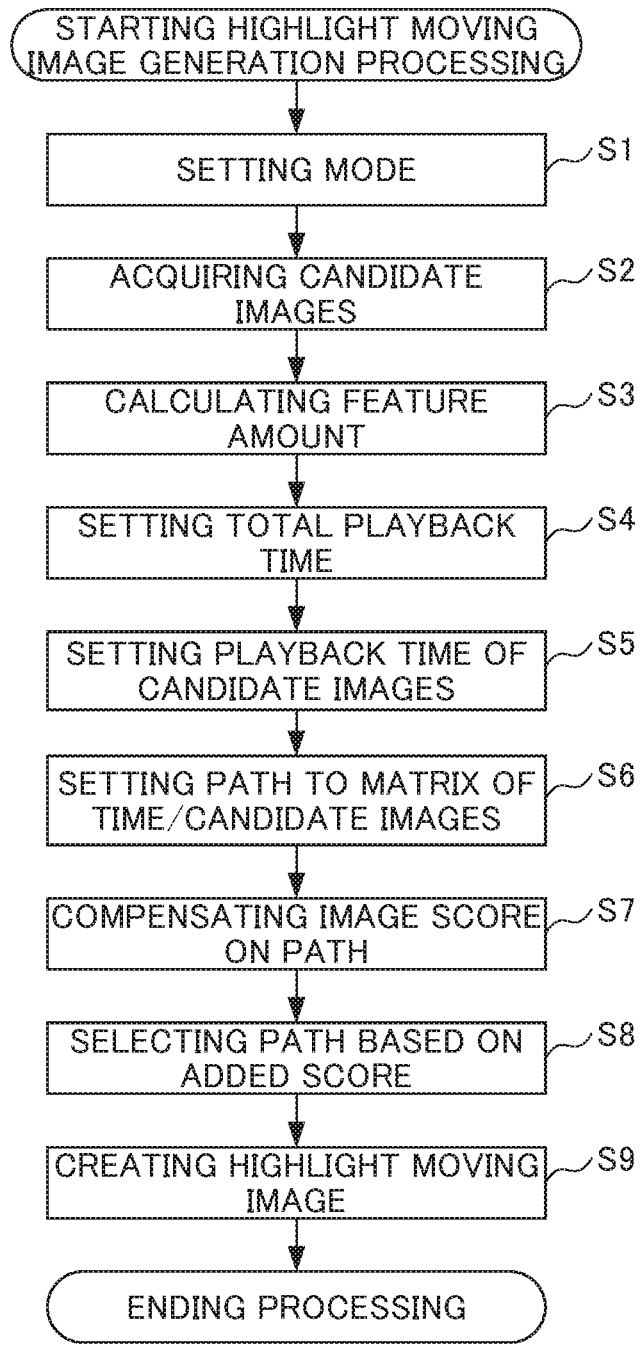
FIG. 6 is a flowchart illustrating a flow of the highlight-moving-image-generation processing executed by the image capture apparatus of FIG. 1 having the functional configuration of FIG. 5.

FIG. 6 is a flowchart illustrating a flow of the highlight-moving-image-generation processing executed by the image capture apparatus 1 of FIG. 1 having the functional configuration of FIG. 5.

The highlight-moving-image-generation processing starts by a user's operation of starting the highlight-moving-image-generation processing on the input unit 18.

In Step S1, the mode setting unit 51 sets a mode via the input unit 18 by the user, for example.

In the present embodiment, the "normal mode" and the "time diffusion improvement mode" as described above can be set.

In Step S2, the image acquisition unit 52 acquires a plurality of candidate images as targets for highlight moving images from the moving image storage unit 71.

In Step S3, the feature-amount-calculation unit 53 calculates a feature amount for each of the candidate images thus acquired. In the present embodiment, the feature amount is calculated based on feature points, etc., within images analyzed through image analyses on the candidate images.

Then, the scores of the candidate images are calculated based on the feature amounts, and ranking of the candidate images is performed according to the scores. In other words, the scores and the ranking are assigned to the candidate images.

In Step S4, the moving-image-playback-time-setting unit 54 sets the maximum playback time (for example, 6 seconds) of a highlight moving image via the input unit 18 by a user.

In Step S5, the image-playback-time-setting unit 55 sets individual playback times of the candidate images within the moving image according to the ranks of the candidate images which are determined based on the scores.

It should be noted that the individual playback times of the candidate images may be configured so as to be set by a user regardless of the scores or the ranks.

In Step S6, the path setting unit 56 sets a path combination (arrangement) that can be selected in a matrix constituted by the individual playback time of the highlight moving image and the candidate images, based on the order of photographing the images and the individual playback times of the candidate images that are set.

In Step S7, the score compensation unit 57 compensates the scores according to the mode that is set.

In other words, in the case of the "time diffusion improvement mode", the score compensation unit 57 calculates Penalty Kp which represents time diffusion of each of the images corresponding to the attention time, based on the indices of the photography time and the order of photographing according to the abovementioned method of "time diffusion improvement".

Then, the score compensation unit 57 compensates the image scores acquired by the optimization classified by score with the Penalty Kp. On the other hand, in the case of the "normal mode", the processing of Step S7 is skipped.

In Step S8, the image selection unit 58 selects a path having the highest added score, and selects the candidate images that constitute the path.

In Step S9, the moving image generation unit 59 generates a highlight moving image which is configured so that the candidate images of the path selected by the image selection unit 58 become the total playback time within the maximum playback time that is set.

Then, the highlight-moving-image-generation processing ends.

With such processing, the expectation highlight time within the total playback time (or the maximum playback time) of the highlight moving image of candidate images is calculated from the photography time and the order of photographing of the candidate images and, as the expectation highlight time is closer to the attention time, the image scores of the candidate images are compensated with greater Penalty Kp.

Therefore, since the added score of the path including the candidate images in which the expectation highlight time is close to the attention time becomes high, a combination path of appropriate images from the viewpoint of time diffusion is easily selected.

For this reason, it is possible to select images with good balance without the photography times being not uneven from a plurality of images photographed.

In addition, it is possible to control the degree of priority for selecting images for the highlight moving image by performing an evaluation of candidate images based on the photography time and the order of photographing of the candidate images.

Second Embodiment

Next, the second embodiment of the present invention will be described below.

Since the image capture apparatus 1 according to the second embodiment is different from that of the first embodiment in the method of "time diffusion improvement", the portion relating to the method of "time diffusion improvement" is mainly described below, and the first embodiment is referred to for the descriptions for the other portions.

Time Diffusion Improvement

As described in the first embodiment, in the case of performing the optimization classified by score, images photographed at close photography times may be selected unevenly in a combination of images selected.

In other words, although the image I1 to the image I5 are photographed in a constant interval in FIG. 3, subsequent images I6 and I7 are not photographed immediately, and, after a predetermined elapse of time, images I8 to I17 are photographed.

In such a case of the distribution of photography times being uneven, when selecting images according to a result from the optimization classified by score, a plurality of images photographed at close times are selected, and thus, it is not possible to select appropriate images.

Therefore, the present method divides a total playback time of the highlight moving image (or the maximum playback time) by the average of individual playback times distributed to candidate images of the highlight moving image.

According to this processing, an average period during which a single image is displayed is calculated, and the total playback time (or the maximum playback time) of the highlight moving image is divided into a section for each of the average periods.

When this is done, the boundary of this section becomes an attention time to switch images.

Then, the method calculates an image distribution which is associated with a distribution based on the photography time of each of the candidate images in a range of photography times of all of the candidate images (the range of an actual time from the earliest photography time to the latest photography time) with the total playback time (or the maximum playback time) of the highlight moving image as a range of photography times, and assigns the candidate images to sections within the total playback time of the highlight moving image according to the image distribution calculated.

In addition, in the case of selecting the candidate images, the candidate images included in a section with the attention time as an origin are compensated so that the image scores become high with greater Penalty Kp, and the candidate images which are not included in the section are compensated so that the image scores become low with smaller Penalty Kp.

With such a configuration, since the added score of the path including desired images from the viewpoint of time diffusion as a result becomes high, a combination path of appropriate images is easily selected from the viewpoint of time diffusion by selecting a combination in which the added score becomes high.

Figure 7:
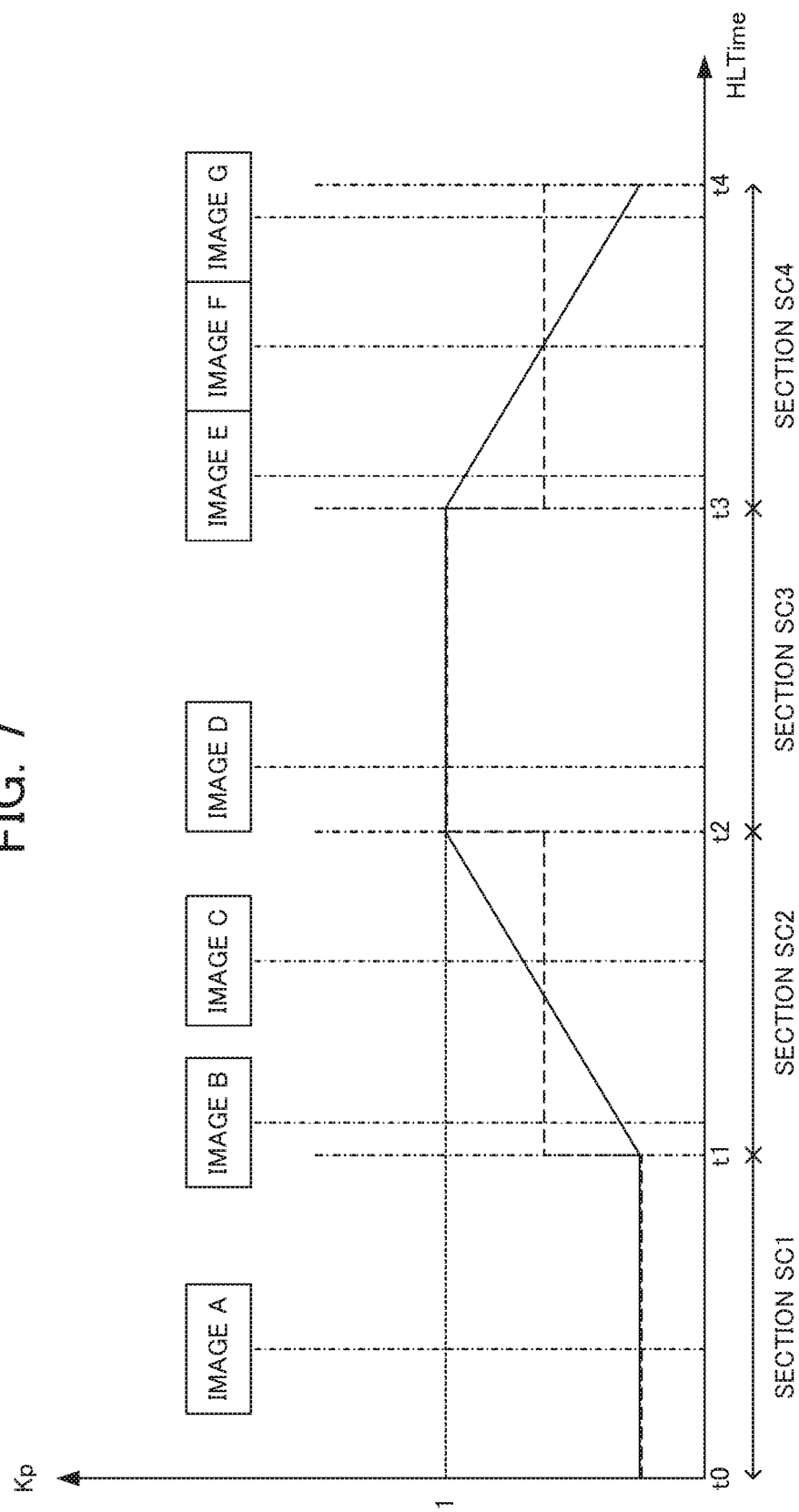
FIG. 7 is a schematic diagram illustrating a setting example of Penalty Kp with respect to attention time.

FIG. 7 is a schematic diagram illustrating a setting example of Penalty Kp with respect to attention time.

Shown in FIG. 7 is a setting example of Penalty Kp in the case of Time t=2 being the attention time in the highlight moving image in which four sections SC1 to SC4 are included from the start time t0 to the end time t4.

In the case of the attention time being 2.0 seconds, "1" is set as Penalty Kp in the section SC3 having the Time t of 2.0 seconds to 3.0 seconds.

In addition, for the section SC2 and the section SC4 adjacent to the section SC3, Penalty Kp (the solid line in FIG. 7) is set so that the score decreases as moving away from the section SC3.

It should be noted that, the minimum Penalty Kp (herein, 0.25) is set in the section SC1 which is the most away from the section SC3.

By changing the attention times sequentially from the time t=1 to time t=4 in similar processing, the sections in which Penalty is set to be high change from SC1 to SC4, a result of which an optimal path selection is performed.

By compensating the image scores of each of the images (Images A to G) with Penalty Kp thus set and selecting a path (an optimal path) in which the added score becomes the highest, a path including appropriate images from the viewpoint of time diffusion is selected.

It should be noted that, in the case of setting Penalty Kp, it is also possible to set Penalty Kp of a constant value in an identical section.

For example, as shown in FIG. 7 with a dashed line, a constant Penalty Kp (herein, 0.5) may be set in the section SC2 and the section SC4 adjacent to the section SC3.

In addition, in the present embodiment, the score compensation unit 57 compensates an image score based on the abovementioned Penalty Kp in the functional block diagram illustrated in FIG. 5 according to the first embodiment.

In other words, the score compensation unit 57 compensates an image score according to the mode that is set. However, in the case of the "normal mode", the score compensation unit 57 does not compensate the image scores.

For example, in the case of the "time diffusion improvement mode", the score compensation unit 57 assigns the candidate images into the sections of the highlight moving image according to photography times using the method of "time diffusion improvement" in the present embodiment.

Then, the score compensation unit 57 sets Penalty Kp of each of the images, which are assigned to the sections with the attention time as an origin for each attention time, to be relatively high, and compensates so as to maintain a high image score.

With such a configuration, since the added score of the path including desired images from the viewpoint of time diffusion as a result becomes high, a combination path of appropriate images is easily selected from the viewpoint of time diffusion.

Figure 8:
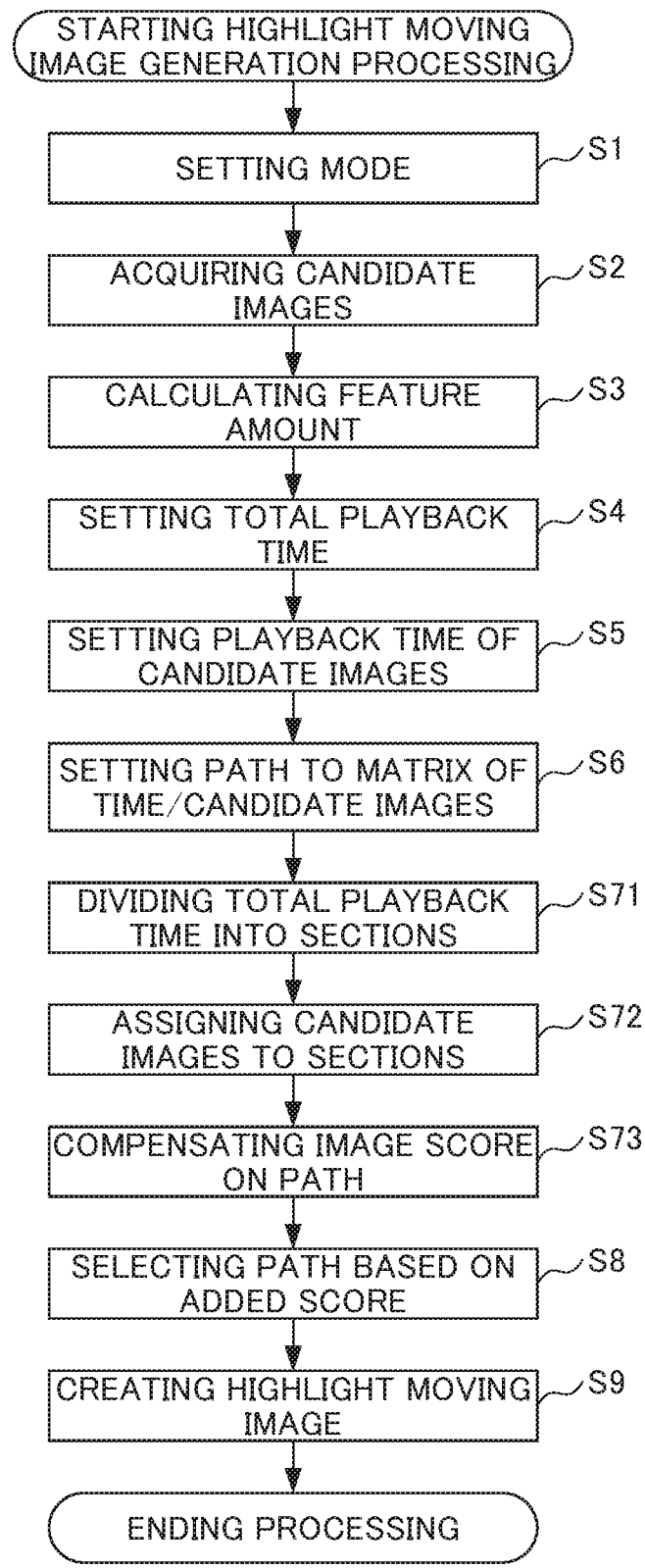
FIG. 8 is a flowchart illustrating a flow of the highlight-moving-image-generation processing executed by the image capture apparatus according to the second embodiment.

FIG. 8 is a flowchart illustrating a flow of the highlight-moving-image-generation processing executed by the image capture apparatus 1 according to the second embodiment.

The highlight-moving-image-generation processing starts by a user's operation of starting the highlight-moving-image-generation processing on the input unit 18.

The processing of Step S1 to Step S6 and Step S8 and Step S9 in FIG. 8 is similar to the highlight-moving-image-generation processing of the first embodiment illustrated in FIG. 6.

After Step S6, in Step S71, the score compensation unit 57 calculates an average period during which a single image is displayed by dividing the total playback time (or the maximum playback time) of the highlight moving image with the average of the individual playback times distributed to the candidate images of the highlight moving image, and divides the total playback time (or the maximum playback time) of the highlight moving image into sections for each of the average periods.

In Step S72, the score compensation unit 57 assigns the range of photography times of the candidate images (the range of an actual time from the newest photography time to the oldest photography time) to the total playback time (or the maximum playback time) of the highlight moving image, and assigns the candidate images to the sections of the highlight moving image according to photography time.

In Step S73, for the candidate images included in the section with the attention time as an origin, the score compensation unit 57 compensates so as to maintain a high image score with Penalty Kp which is relatively higher than the scores of the other images.

It should be noted that the processing of Step S71 to Step S73 is executed in the case of the "time diffusion improvement mode" and is skipped in the case of the "normal mode".

After Step S73, the processing advances to Step S8.

With such processing, the distribution of photography time of the candidate images is associated with the distribution of locations within the total playback time (or the maximum playback time) of the highlight moving image, and the image scores of the candidate images which are assigned to the sections with the attention time as an origin are compensated so as to maintain a high score with greater Penalty Kp.

Therefore, since the added score of the path including the candidate images located in the section with the attention time as an origin becomes high, a combination path of appropriate images from the viewpoint of time diffusion is easily selected.

Therefore, it is possible to select images with good balance from a plurality of images photographed.

In addition, as compared to the method of the "time diffusion improvement" according to the first embodiment, it is possible to realize the function of selecting the images with good balance from the plurality of images photographed by way of processing with lower load.

In addition, in the present embodiment, it may be configured so as to set the maximum number of images for playback instead of setting the maximum playback time and to select a plurality of static images from the candidate images with the maximum number of images for playback as a restriction, thereby creating a single image (a so-called collage image, etc.) including the plurality of images.

With such a configuration, since it is possible to select a combination of appropriate images from the viewpoint of time diffusion, it is possible to create a single image by the images selected with good balance from a plurality of images photographed.

Modified Embodiment 1

In the first embodiment, it is possible to calculate Penalty Kp by various methods such as calculating according to Formula (4).

For example, the value arrived at by squaring the right side of Formula (4) can be set as Penalty Kp.

In addition, it is also possible to set Penalty Kp as a Gaussian distribution with the expectation highlight time as the center.

Figure 9:
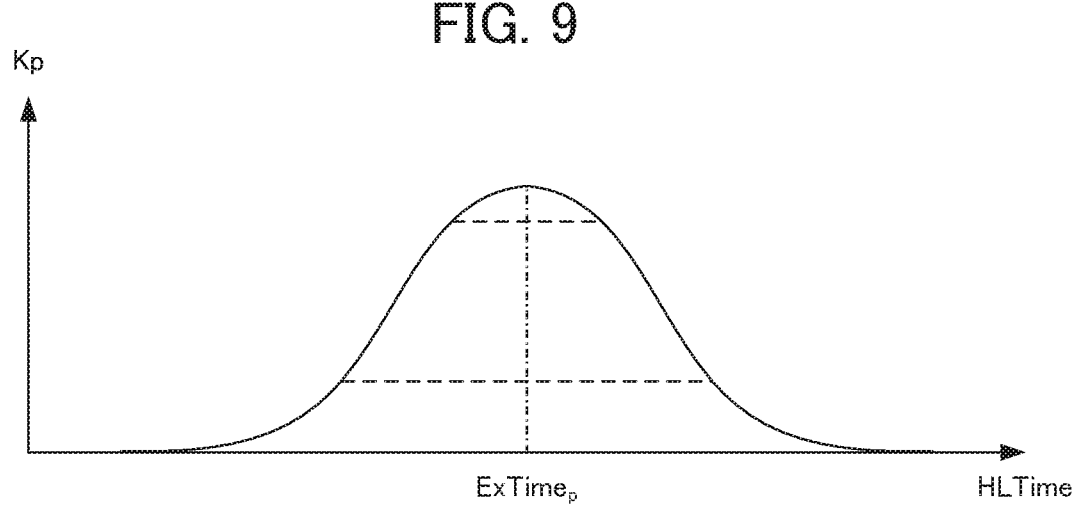
FIG. 9 is a schematic view illustrating a characteristic in a case of Penalty Kp being set as a Gaussian distribution.

FIG. 9 is a schematic view illustrating a characteristic in a case of Penalty Kp being set as a Gaussian distribution.

As illustrated in FIG. 9, in the case of Penalty Kp being a Gaussian distribution (the solid line in FIG. 9), the change of Penalty Kp is emphasized more than the characteristic shown in FIG. 4 according to the deviation from the expectation highlight time.

It should be noted that, as illustrated by the dashed lines in FIG. 9, it may be configured to provide the upper limit and the lower limit for the value of Penalty Kp in order to clip the value.

The image capture apparatus 1 configured as above includes the image acquisition unit 52, the feature-amount-calculation unit 53, the score compensation unit 57, and the image selection unit 58.

The image acquisition unit 52 acquires a plurality of images.

The image acquisition unit 52 acquires information relating to image capture timing of the plurality of images.

The feature-amount-calculation unit 53 and the score compensation unit 57 evaluate the plurality of images based on the information relating to the image capture timing.

The image selection unit 58 selects a predetermined number of images among the plurality of images based on an evaluation result by the feature-amount-calculation unit 53 and the score compensation unit 57.

With such a configuration, since it is possible to evaluate images in consideration of the image capture timing of the images, it is possible to select a combination of appropriate images from the viewpoint of time diffusion.

Therefore, it is possible to select images with good balance from a plurality of images photographed.

The feature-amount-calculation unit 53 evaluates the plurality of images based on predetermined information other than information relating to the image capture timing.

The image selection unit 58 selects a predetermined number of images among the plurality of images based on the information relating to the image capture timing and the evaluation result by the feature-amount-calculation unit 53.

With such a configuration, it is possible to evaluate a plurality of images by reflecting the image capture timing of the plurality of images and the evaluation result other than the image capture timing of the plurality of images.

The score compensation unit 57 evaluates the evaluation result by the feature-amount-calculation unit 53 based on the information relating to the image capture timing of the image.

With such a configuration, it is possible to change the evaluation of the image according to the image capture timing.

The score compensation unit 57 evaluates the plurality of images based on the relationship between the image capture timing of the plurality of images and the display timing of each of the images in the case of creating a moving image from the images selected by the image selection unit 58.

With such a configuration, since it is possible to evaluate the plurality of images according to the relationship between the image capture timing of the plurality of images and the display timing in the case of creating a moving image, it becomes possible to select more appropriate images as the display timing in the moving image.

The path setting unit 56 sets the number of images selected by the image selection unit 58.

The image selection unit 58 selects images among the plurality of images based on the number of images set by the path setting unit 56.

With such a configuration, it is possible to select appropriate images by prioritizing the number of images to be played back.

The feature-amount-calculation unit 53 performs an evaluation based on a feature amount by calculating the feature amount possessed by an image.

Based on the image capture timing, the score compensation unit 57 calculates an evaluation result of the image by compensating the evaluation based on the feature amount.

With such a configuration, since it is possible to calculate the evaluation result of the image by reflecting the image capture timing on the evaluation based on the feature amount of the image, it is possible to select the image with the evaluation standard with good balance.

In addition, the image capture apparatus 1 includes the moving-image-playback-time-setting unit 54 and the image-playback-time-setting unit 55.

The image-playback-time-setting unit 55 sets an individual playback time for each of the plurality of images.

The moving-image-playback-time-setting unit 54 sets a target playback time of a moving image created by the images selected from the plurality of images.

The score compensation unit 57 sets an ideal display timing of the image within the target playback time based on the order of photographing of the plurality of images and the image capture timing.

The image selection unit 58 selects the number of images within the target playback time based on the ideal display timing and the individual playback time.

With such a configuration, it becomes possible to select only the appropriate number of appropriate images from the viewpoint of display timing.

The score compensation unit 57 associates the range of the image capture timing of the plurality of images with the target playback time or the total playback time of the images selected, and specifies the ideal display timing of each of the images in the target playback time or the total playback time of the image selected.

With such a configuration, the images for which the display timing of each of the images in the target playback time is associated with the image capture timing of the plurality of images can be easily selected.

The image selection unit 58 selects the images in a predetermined order from the plurality of images based on the ideal display timing.

With such a configuration, it is possible to select the images according to the ideal display timing.

The score compensation unit 57 compensates the evaluation based on a feature amount based on the comparison result between the standard time in a moving image created by images selected from the plurality of images and the image capture timing of the plurality of images.

With such a configuration, it is possible to select the moving image by associating the standard time in the moving image with the image capture timing of the image.

With a greater difference between the standard time in the moving image created by the images selected among the plurality of images and the image capture timing of the plurality of images, the score compensation unit 57 compensates less an evaluation based on the feature amount of the image.

With such a configuration, the images with the image capture timing which is adapted for the standard time in the moving image can be easily selected.

The score compensation unit 57 calculates an evaluation value by weighting the order of photographing of the plurality of images and the image capture timing and evaluates the plurality of images based on the evaluation value.

With such a configuration, it is possible to perform the evaluation of the image by reflecting the order of photographing of the images and the image capture timing appropriately.

The feature-amount-calculation unit 53 calculates the feature amount possessed by images based on attribute information of each of the plurality of images.

The image selection unit 58 preferentially selects an image having a higher value of the evaluation based on the feature amount than a standard value.

With such a configuration, an image having a higher evaluation value can be easily selected.

The feature-amount-calculation unit 53 calculates the feature amount based on information relating to a use state of the image as the attribution information.

With such a configuration, it is possible to calculate the feature amount of the image by reflecting the use state of a user.

The use state includes various pieces of information such as information relating to a number of playback times and information relating to uploading to SNS.

With such a configuration, it is possible to calculate the feature amount of the image by reflecting the use state of the image in various forms such as the number of playback times and uploading to SNS, by the user.

The score compensation unit 57 classifies the plurality of images into a plurality of groups based on the image capture timing and evaluates each of the images based on the groups classified.

With such a configuration, it is possible to select a combination of appropriate images from the viewpoint of time diffusion.

The path setting unit 56 sets the number of target images of a moving image created by the images selected from the plurality of images.

The number of target images is set with a number lower than the total number of a plurality of static images.

The image selection unit 58 selects the number of target images from the plurality of images.

With such a configuration, it is possible to select images with good balance from a plurality of images photographed with the number of images as a standard.

It should be noted that the present invention is not to be limited to the aforementioned embodiments, and that modifications, improvements, etc. within a scope that can achieve the objects of the present invention are also included in the present invention.

Although the maximum playback time of a moving image is set as the limitation of a highlight moving image in the abovementioned embodiment, the present invention is not limited thereto and may be configured so that the maximum number of frame images constituting a moving image may be set as a condition for limitation, for example.

Furthermore, although it is configured to acquire a plurality of static images as candidate images and select images from the candidate images thus acquired so as to generate a highlight moving image in the abovementioned embodiment, it may be configured so as to set frame images constituting a moving image in a moving image or a plurality of moving images as candidate images.

Furthermore, it may also be configured to generate an image which is created from a plurality of static images, for example, in place of the highlight moving image.

In addition, although the individual playback time of the candidate images within the moving image in the abovementioned embodiment is set according to ranks of the candidate images determined based on the image scores, it may be configured so that the moving-image-playback-time-setting unit 54 changes the individual playback time of the candidate images according to the image score after the compensation by the moving-image-playback-time-setting unit 54.

In addition, although it is described in the abovementioned embodiment that the image score calculated by the feature-amount-calculation unit 53 is compensated by the score compensation unit 57, the present invention is not limited thereto. It may also be configured so that the feature-amount-calculation unit 53 includes the function of the score compensation unit 57 and calculates directly the image score after compensation.

In addition, although it is described in the abovementioned embodiment that the total playback time (or the maximum playback time) of the highlight moving image is divided by the average period (the individual playback time) in which a single image is displayed) in the case of dividing into sections, the present invention is not limited thereto. For example, it may be configured so as to set arbitrary sections such as morning, daytime, and night.

In addition, it may also be configured so as to change the length of the sections according to the number of images in the case of the candidate images being assigned to the sections. For example, with a greater number of images included in a section, it is possible to compensate so as to extend the length of the section.

In addition, although the candidate images are selected by setting the maximum playback time of the highlight moving image in the abovementioned embodiment, the present invention is not limited thereto. For example, it may be configured so as to select the candidate images by setting the number of images to be included in the highlight moving image.

In such a case, it is possible to select a path with the number of images that is set among the combinations of the candidate images which are set by the path setting unit 56. In addition, it may be configured so that the path setting unit 56 sets only a path with the number of images that is set.

In addition, in the abovementioned embodiment, in a case in which the path setting unit 56 sets a path combination (arrangement) which can be made in a matrix that is constituted by the maximum playback time and the candidate images of the highlight moving image, it may be configured so as to preferentially select an image having a higher image score than that of the standard value. Alternatively, in the case of selecting a path combination that is set by the path setting unit 56, it may configured so as to preferentially select a path including an image having a higher image score than that of the standard value. For example, in a case in which paths having identical or close added scores are selectable, it is possible to select the path including an image having a higher image score than that of the standard value.

With such a configuration, an image having a high image score can be selected.

In the aforementioned embodiments, explanations are provided with the example of the image capture apparatus 1 to which the present invention is applied being a digital terminal; however, the present invention is not limited thereto in particular.

For example, the present invention can be applied to any electronic device in general having the highlight-moving-image-generation processing function. For example, the present invention can be applied to a laptop personal computer, a printer, a television receiver, a video camera, a portable navigation device, a cell phone device, a smartphone, a portable gaming device, and the like.

The processing sequence described above can be executed by hardware, and can also be executed by software.

In other words, the hardware configuration of FIG. 10 is merely an illustrative example, and the present invention is not particularly limited thereto. More specifically, the types of functional blocks employed to realize the above-described functions are not particularly limited to the examples shown in FIG. 10, so long as the information processing apparatus 1 can be provided with the functions enabling the aforementioned processing sequence to be executed in its entirety.

A single functional block may be configured by a single piece of hardware, a single installation of software, or a combination thereof.

In a case in which the processing sequence is executed by software, the program configuring the software is installed from a network or a storage medium into a computer or the like.

The computer may be a computer embedded with dedicated hardware. Alternatively, the computer may be a computer capable of executing various functions by installing various programs, e.g., a general-purpose personal computer.

The storage medium containing such a program can not only be constituted by the removable medium 31 of FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is recorded or a hard disk, etc. included in the storage unit 20 of FIG. 1.

It should be noted that, in the present specification, the steps defining the program recorded in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing apparatus comprising a processor which is configured to execute:
    image acquisition processing that acquires a plurality of images;
    image evaluation processing that evaluates the plurality of images acquired;
    individual playback time calculation processing that calculates an individual playback time of each of the plurality of images based on an evaluation result of the plurality of images evaluated by the image evaluation processing;
    playback time setting processing that sets a playback time of a moving image generated from the plurality of images;
    timing acquisition processing that acquires information relating to image capture timing of the plurality of images;
    first evaluating processing that evaluates the plurality of images based on the information relating to the image capture timing; and
    selection processing that selects a predetermined number of images among the plurality of images based on an evaluation result by the first evaluation processing and further based on the individual playback time, so that the selected predetermined number of images fit within the playback time.

2. The image processing apparatus according to claim 1, wherein the processor further executes division processing that divides an entire range of image capture timing of the plurality of images into a plurality of intervals for each of predetermined time; and,
    wherein, in the evaluation processing, the processor evaluates images according to whether image capture timing of a predetermined image among the plurality of images is included in a predetermined interval among the plurality of intervals.

3. The image processing apparatus according to claim 2, wherein, in the first evaluation processing, the processor evaluates the predetermined image as lower for a greater difference between the image capture timing of the predetermined image among the plurality of images and the predetermined interval among the plurality of intervals, and the processor evaluates the predetermined image as higher for a smaller said difference.

4. The image processing apparatus according to claim 1, wherein, in the first evaluation processing, the processor evaluates the plurality of images based on a relationship between the image capture timing of the plurality of images and display timing of each of the images in a case of creating a moving image from the images selected.

5. The image processing apparatus according to claim 1, wherein the processor executes selected-image-number setting processing that sets a number of images selected by the selection processing, and,
    wherein, in the selection processing, the processor selects the number of images from the plurality of images based on the number of images set by the selected-image-number setting processing.

6. The image processing apparatus according to claim 5, wherein the processor:
    sets a target playback time of a moving image created by images selected from the plurality of images in the selected-image-number setting processing;
    sets, in the first evaluation processing, an ideal display timing of the image within the target playback time, based on an order of image-capturing the plurality of images and the image capture timing; and
    selects, in the selection processing, a number of images within the target playback time, based on the ideal display timing.

7. The image processing apparatus according to claim 6, wherein, in the first evaluation processing, the processor associates a range of the image capture timing of the plurality of images with the target playback time or a total playback time of the images selected, and specifies the ideal display timing of each of the images in the target playback time or the total playback time of the images selected.

8. The image processing apparatus according to claim 6, wherein, in the selection processing, the processor selects images in a predetermined order among the plurality of images based on the ideal display timing.

9. The image processing apparatus according to claim 1, wherein, in the first evaluation processing, by performing an evaluation based on a feature amount that an image acquired by the image acquisition processing possesses and then compensating an evaluation result based on the feature amount based on the image capture timing, the processor calculates an evaluation result of the image.

10. The image processing apparatus according to claim 1, wherein, in the first evaluation processing, the processor calculates an evaluation value by weighting an order of image-capturing the plurality of images and the image capture timing and evaluates the plurality of images based on the evaluation value.

11. The image processing apparatus according to claim 1, wherein, in the first evaluation processing, the processor calculates a feature amount that the image possesses based on attribute information of each of the plurality of images, and
    wherein, in the selection processing, the processor preferentially selects an image having a higher value of the evaluation based on the feature amount than a standard value.

12. The image processing apparatus according to claim 11, wherein, in the evaluation processing, the processor calculates the feature amount based on information relating to a use state of the image as the attribute information.

13. The image processing apparatus according to claim 1, wherein, in the first evaluation processing, the processor classifies the plurality of images into a plurality of groups based on the image capture timing and evaluates each of the images based on the groups classified.

14. The image processing apparatus according to claim 1, wherein the processor executes target-image-number setting processing that sets a number of target images of a moving image created by the images selected among the plurality of images, and wherein, in the selection processing, the processor selects the number of target images among the plurality of images.

15. An image processing apparatus comprising a processor which is configured to execute:

image acquisition processing that acquires a plurality of images;

timing acquisition processing that acquires information relating to image capture timing of the plurality of images;

first evaluation processing that evaluates the plurality of images based on the information relating to the image capture timing; and selection processing that selects a predetermined number of images among the plurality of images based on an evaluation result by the first evaluation processing, wherein, in the first evaluation processing, by performing an evaluation based on a feature amount that an image acquired by the image acquisition processing possesses and then compensating an evaluation result based on the feature amount based on the image capture timing, the processor calculates an evaluation result of the image, and wherein, in the first evaluation processing, the processor compensates an evaluation based on the feature amount, based on a comparison result between a standard time in the moving image created by the images selected among the plurality of images and the image capture timing of the plurality of images.

16. An image processing apparatus comprising a processor which is configured to execute:

image acquisition processing that acquires a plurality of images;

timing acquisition processing that acquires information relating to image capture timing of the plurality of images;

first evaluation processing that evaluates the plurality of images based on the information relating to the image capture timing; and selection processing that selects a predetermined number of images among the plurality of images based on an evaluation result by the first evaluation processing, wherein, in the first evaluation processing, by performing an evaluation based on a feature amount that an image acquired by the image acquisition processing possesses and then compensating an evaluation result based on the feature amount based on the image capture timing, the processor calculates an evaluation result of the image, wherein, in the first evaluation processing, the processor compensates an evaluation based on the feature amount, based on a comparison result between a standard time in the moving image created by the images selected among the plurality of images and the image capture timing of the plurality of images, and wherein, in the first evaluation processing, for a greater difference between the standard time in the moving image created by the images selected among the plurality of images and the image capture timing of the plurality of images, the processor compensates less an evaluation based on the feature amount of the image.

17. An image processing method executed by an image processing apparatus, the method comprising the steps of:

acquiring a plurality of images;

evaluating the acquired plurality of images;

calculating an individual playback time of each of the plurality of images based on an evaluation result of the evaluation of the plurality of images;

setting a playback time of a moving image generated from the plurality of images;

acquiring information relating to image capture timing of the plurality of images;

evaluating the plurality of images based on the information relating to the image capture timing; and selecting a predetermined number of images among the plurality of images based on the image capture timing evaluation and further based on the individual playback time, so that the selected predetermined number of images fit within the playback time.

18. A non-transitory storage medium encoded with a computer-readable program that enables a computer to execute:

an image acquisition function that acquires a plurality of images;

an image evaluation function that evaluates the plurality of images acquired;

an individual playback time calculation function that calculates an individual playback time of each of the plurality of images based on an evaluation result of the plurality of images evaluated by the image evaluation function;

a playback time setting function that sets a playback time of a moving image generated from the plurality of images;

a timing acquisition function that acquires information relating to image capture timing of the plurality of images;

a timing evaluating function that evaluates the plurality of images based on the information relating to the image capture timing; and a selection function that selects a predetermined number of images among the plurality of images based on an evaluation result by the timing evaluating function and further based on the individual playback time, so that the selected predetermined number of images fit within the playback time.

* * * * *